Nov. 27, 1928.
J. R. ELLIS
1,693,227
BRICK COURSE GAUGE
Original Filed April 24, 1926
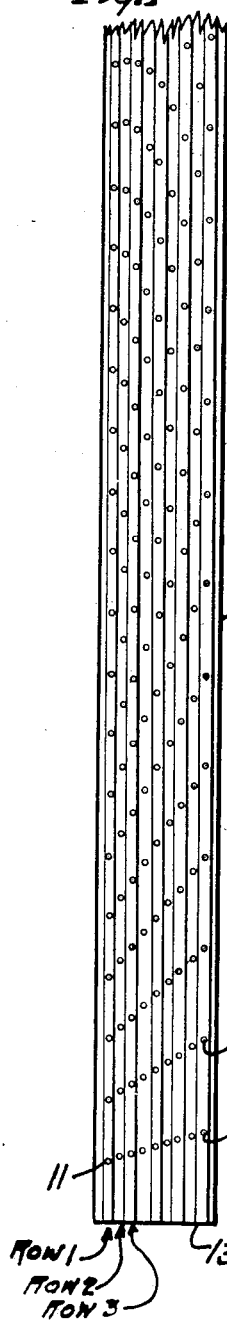
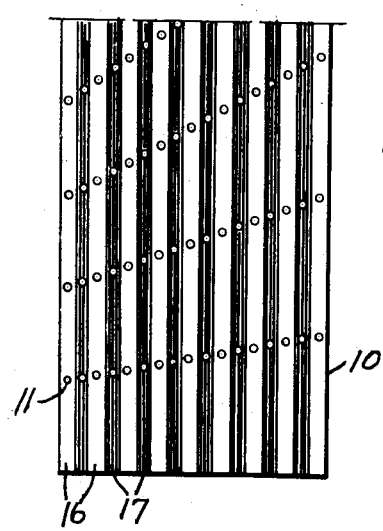
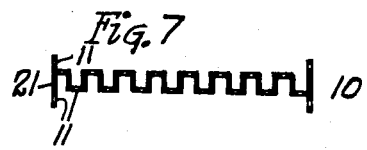
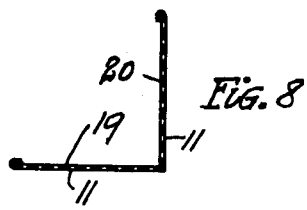
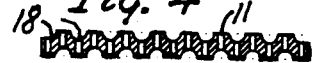
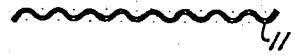
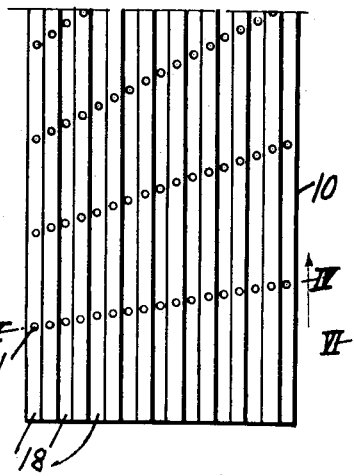
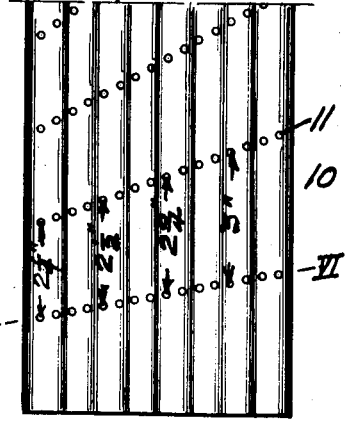
INVENTOR
John R. Ellis
By J. H. Weatherford
ATTORNEY Patented Nov. 27, 1928.

1,693,227

UNITED STATES PATENT OFFICE.

JOHN R. ELLIS, OF MEMPHIS, TENNESSEE.

BRICK-COURSE GAUGE.

Application filed April 24, 1926, Serial No. 104,322. Renewed June 15, 1928.

This invention relates to a device especially designed for spacing and laying off courses of brick in building operations; or for similarly laying off equal spaces for other purposes.

It has especial reference to a device whereby the spacing of brick courses may be made to actually conform to any given space, such for instance as the spaces from the top of a footing to the bottom of a window sill, whereby the courses of brick laid therebetween may be made to come out equal.

In laying up brick, it is possible with brick of a given thickness to vary the spacing by the simple expedient of enlarging the mortar joint. In ordinary brick work a brick is 2¼ inches thick and brick may be laid with practically no mortar between them at such a spacing. Ordinarily however, the mortar joint ranges from ¼ inch to ¾ inch thick;

The objects of my invention, are (a) To provide a gauge whereby, having determined the desired thickness of mortar joint the proper position for each of a number of courses of brick may be laid off in advance of beginning the brick laying or at any time thereafter.

(b) To provide a gauge whereby, having determined the approximate thickness of mortar joint wanted, it may be easily determined what slight variation is necessary in thickness of joint, and therefore in spacing of courses, in order to make the courses come out right, within a limited space, and to provide means thereafter for laying off these spaces so that the brick work when completed will conform to the spaces.

(c) To provide means whereby the spacing of the courses having been determined, it will be feasible to follow that particular line of spacings on the gauge which has been selected, and (d) To generally improve the design and construction of such a gauge.

The means by which I accomplish the foregoing and other objects, and the manner of their accomplishment, will readily be understood from the description on reference to the accompanying drawings, in which,—

Fig. 1 is a side elevation of the simplest form of the gauge, the top part being broken away.

Fig. 2 is a side elevation on a slightly larger scale of the bottom end of the gauge in which alternate white and black bands have been indicated for the purpose of defining the rows of holes or markings.

Fig. 3 is a similar elevation of the lower part of the gauge, and

Fig. 4 is a section on the line IV—IV of Fig. 3, looking in the direction of the arrow, showing the alternate rows of holes outlined by grooves.

Fig. 5 is a similar elevation of the lower end of a gauge, and

Fig. 6 a section on the line V—V of Fig. 5, showing a modification in which the gauge is made of corrugated material, alternate rows of holes being at the tops and bottoms of the corrugations.

Fig. 7 is a section similar to Fig. 6, but showing rectangular rather than undulating corrugations.

Fig. 8 is a cross section of a modified form of the gauge in which the gauge is stiffened by being made in the shape of an angle.

Referring now to the drawings in which the various parts are indicated by numerals, the gauge consists primarily of a strip or board 10 which may be of any desired width or length but which I ordinarily make about 6 inches wide by 6 feet long. This board has holes 11 therethrough, which holes are laid off in longitudinal rows, substantially parallel with the edges of the strip. Where used strictly for a brick-course gauge, the first hole in row 12 is spaced a distance away from the bottom end 13 of the board, equal to the thickness of an ordinary brick. The next hole in this row is spaced an equal distance therefrom and each of the remaining holes is also equally spaced from those adjacent thereto. The first hole in row 14 is spaced a slightly greater distance from the bottom and the remaining holes are equally spaced, the distance between any two holes being equal to the distance of the first hole from the bottom. In row 15, the first hole is still further away, preferably the increment of increase being equal to the increment of increase of row 14 over row 12.

As a practical example, I have shown in Fig. 1 a board having nine rows of holes the distance from the end of the board to the first hole in row 11 has been established 2¼ inches and the distance apart of the holes in that row have been made 2¼ inches. In row 2, the first hole is 2⅜ inches from the bottom and the holes 2⅜ inches apart. In row 3, the first hole is 2½ inches from the bottom and the holes 2½ inches apart and the spacing between the holes in the next adjoining row has been increased ⅛ of an inch, the remaining rows increasing in spacing by the same increments.

In the remaining figures, I have shown a greater number of rows of holes and in such case I prefer to use a less increment of increase of distance between the holes in one row over the distance between the holes in the next adjoining row.

In Fig. 2 I have shown the lower end of the board 10 having alternate white stripes 16 and black or colored stripes 17, so that any one row of holes may be easily followed from one end of the gauge to the other.

In Figs. 3 and 4, I have outlined the alternate rows of holes by forming grooves 18 in the surface of the board so that the first, third and fifth etc., rows are in grooves; whereas on the opposite side of the board the second, fourth, etc., rows are in grooves.

In Figs. 5 and 6 the same result has been accomplished by corrugating the board so that the rows of holes alternately come at the bottom and top of the corrugations and this has also been shown in Fig. 7, where a rectangular corrugation has been substituted for the undulating corrugations of Figs. 5 and 6.

By means of this marking, either by coloring or mechanical grooving, or corrugations, it is entirely feasible to follow one row of holes from one end of the board to the other. If desired, various colored stripes may be substituted for the black stripes 17, in Fig. 2, in order that the rows may be more distinctly defined and should it be so desired, the mechanical lining shown in the other figures may be also accentuated by painting.

In Fig. 8, I have shown a form of board having two legs 19, 20, at right angles. Each of these legs is provided with holes 11 which holes are in rows as in the other cases.

In Fig. 7, the edges of the board may be finished with flanges 21 extending at right angles to the general surface of the board, in order to stiffen the same, and each edge of these flanges may be provided with holes 11 in rows. Should it be so desired, the distance between the holes in one or more of the rows of holes may be directly indicated by writing on the face of the board, such distances as is shown in Fig. 5 where the distance between the first row of holes is shown to be 2¼ inches and between other rows of holes, 2½ inches, 2¾ inches and 3 inches.

It will of course be understood, that I have indicated and suggested dimensions purely for example and that I do not wish thereby to limit myself even approximately to such dimensions; as it will very clearly be seen that for other uses than a brick gauge the particular spacings which I have given for example, would be wholly out of place as would also be the size of the gauge, which these dimensions would require.

In using the gauge for example, in brick work, the gauge is placed on the top of a footing or a course of brick, or at such other place where it is desired that the brick work shall begin, and the desired spacing of courses having been selected the particular row of holes is used which corresponds to such spacing. The location of each course may then be marked with a pencil through the various holes in the row in succession, or nails may be driven to mark the position of the course and thereafter removed, unless they be without heads, in such case they may be left in place. The same marking is then used at the opposite end of the row or course of brick and a string stretched between corresponding marks for the mason to work by in the usual manner.

In starting off from the foundation, it is very often the case, that the bottom of the window sill, or other projection, is at such height above the foundation, the desired spacing of courses, would require that a half brick be used. In such case, the gauge may be used to measure from the top of the footing to the bottom of the sill, and such spacing selected as will bring an even number of courses which may generally be done without varying very largely from the intended spacing. Such new spacing may then be adopted and used with a knowledge that the courses will run out at the proper place.

Various other uses will readily suggest themselves for this gauge.

It will be distinctly understood that the drawings are illustrative only, and that various modifications may be made in the details of construction and that I do not wish to limit myself to such details except in so far as the same are specifically hereinafter set out in the claims.

Having now fully described the invention, what is claimed is :—

1. A gauge, comprising an elongated member having spaced longitudinal corrugations, and having holes therethrough in corresponding longitudinal rows, the holes in any one row being equally spaced, and the spacing between holes in one row varying from that in any other row.

2. A gauge comprising an elongated flat member having spaced longitudinal corrugations, and having a plurality of holes therethrough arranged in corresponding longitudinal rows, the holes in any one row being equally spaced, the spacing of holes in any two adjacent rows varying by equal increments.

3. A gauge comprising an elongated flat member having holes therethrough, the holes being arranged in rows extending lengthways of said member, the holes in each row being equally spaced, and the spacing of the holes in the rows varying progressively, and means defining said longitudinal rows.

In testimony of the foregoing, I affix my signature.

JOHN R. ELLIS.